June 27, 1961 M. C. SANZ ET AL 2,990,351
NUCLEAR REACTOR ELEMENT
Filed March 1, 1948

MANUEL C. SANZ
CHARLES N. SCULLY
INVENTORS.

BY William R. Lane
ATTORNEY 2,990,351
NUCLEAR REACTOR ELEMENT
Manuel C. Sanz, Los Angeles, and Charles N. Scully, Pasadena, Calif., assignors, by mesne assignments, to the United States of America as represented by the United States Atomic Energy Commission
Filed Mar. 1, 1948, Ser. No. 12,286
1 Claim. (Cl. 204—193.2)

This invention pertains to the construction of a nuclear reactor.

The invention more particularly concerns the use of a vapor phase process for treating moderator material.

It is therefore an object of this invention to control the impregnation of the fissionable material in the moderator matrix both as to amount and distribution.

It is a further object of this invention to protect exposed surfaces of moderator material against reducing or oxidizing atmospheres.

It is yet another object of this invention to provide a nuclear reactor having a moderator suitably impregnated with fissionable material and provided with protective ceramic or refractory coatings applied in a vapor phase.

Other objects of invention will become apparent from the following description taken in connection with the accompanying drawing, in which FIG. 1 is a schematic arrangement of a pile formed in accordance with the present invention;

Figure 1:
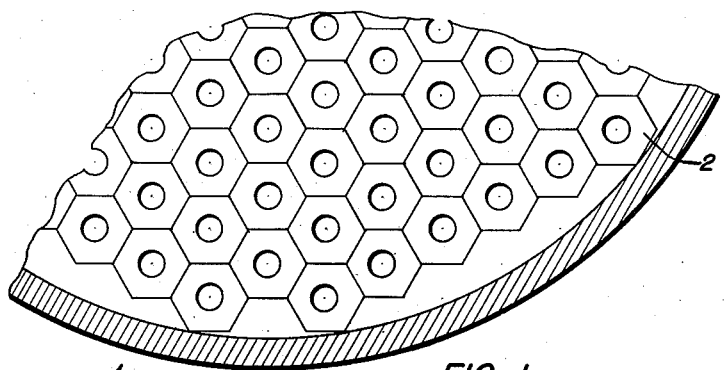
Figure 2:
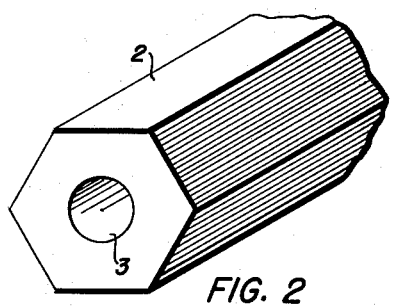
FIG. 2 is an isometric view of an element composing the pile.

Referring to the drawings, 1 is a nuclear reactor pile composed of a plurality of elements 2 formed in accordance with the present invention. These elements, in the preferred embodiment of the invention, comprise a moderator 6 of suitable material, such as graphite, beryllium, or the like, or hexagonal shape in exterior contour and having a surface formed by opening 3 therethrough which may be circular or other suitable contour. The exterior of the element is made hexagonal to permit the nesting of the elements in a unitary pile, but may be made square or of other suitable contour.

Figure 4:
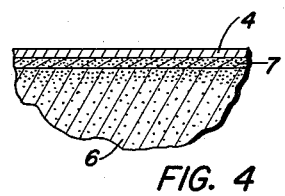
FIGS. 4 and 5 are enlarged sectional detail views of different arrangements of material forming the reactor.

The moderator element is impregnated with fissionable material as illustrated in FIG. 4. It is desirable that the fissionable material be concentrated adjacent to the surface contacted by the heat-transfer gas. Thus the density of the fissionable material may be inversely proportional to the distance from such surface. If desired a layer of fissionable material as at 7 may be concentrated on such surface. This impregnation may be effected in any suitable manner, but preferably by means of a vapor phase process.

This process comprises substantially the volatilization of a halogen or carbonyl salt. Such volatilization takes place in the presence of a gas which becomes saturated with the salt and acts as a carrier for the same. The gas may be helium, hydrogen, a hydrocarbon, or the like. The gas is then conducted into an evacuated chamber which is heated at a controlled temperature so that decomposition of the salt takes place on the moderator element.

Such a process produces a uniform impregnation of the moderator material with the fissionable material and at the same time allows controlled penetration of the fissionable material into the moderator. Such control may be obtained by varying the conditions of the vapor phase process, such as the pressure, and may result in a greater desnsity of fissionable material near the surface. Not only can the penetration and concentration be controlled, but also the exterior surface of the moderator may be built up with a predetermined concentration of fissionable material, if desired, as at 7 in FIGS. 4 and 5.

When the moderator element has been suitably impregnated with fissionable material it may be given a protective coating of ceramic or refractory material. These materials are chosen because they are chemically inert to action of the gases and also because they have good adhesion to the moderator.

The protective coating prevents the heat-transfer gases from attacking the fissionable material. In instances where the heat-transfer gas is air, an oxidizing action takes place, requiring a coating of material such as ceramic oxide or molybdenum silicide. Where the heat-transfer gas is hydrogen or a similar gas that will act as a reducing agent, tantalum carbide or the like may be used for the protective coating.

The protective coating is applied to the inside surface of the moderator element at 4 to prevent deterioration of the moderator as the result of action of reducing or oxidizing atmospheres. Because of the possibility of gas leakage and similar deterioration to the outside of the moderator element, it may also be coated, if desired, as at 5. Such coating is preferably applied by a vapor phase process.

Another feature of the invention comprises the use of a layer to prevent diffusion and chemical action between the fissionable material, protective coating and the graphite moderator. For instance, a graphite fissionable material impregnated moderator adjacent a tantalum carbide protective coating would result in deterioration of the protective coating. Accordingly, a diffusion prevention coating of material such as titanium nitride or tantalum nitride may be desirable to prevent loss by diffusion into the heat-transfer gas of moderator or fissionable material such as graphite or uranium respectively.

Figure 5:
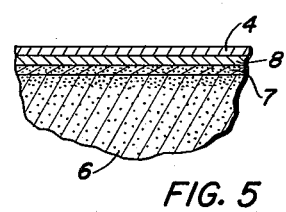
Figure 3:
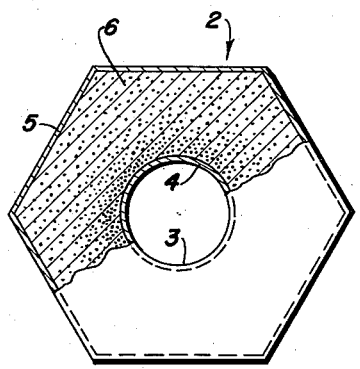
FIG. 3 is a sectional view through the element shown in FIG. 2.

Such an arrangement is illustrated in FIG. 5, this being an enlarged detailed sectional view of a portion of a reactor element. As illustrated in FIG. 5, moderator material 6, such as graphite, is impregnated with fissionable material such as uranium salts which include a built-up fissionable layer 7. The diffusion prevention coating 8 and protective coating 4 are then applied. In the event gas having a reducing action is used, tantalum carbide is used for the protective coating 4, whereas if the heat-transfer gas obtains an oxidizing action, coating 4 will comprise material such as ceramic silicide.

Although the invention has been described and illustrated in detail, it is to be clearly understood that the same is by way of illustration and example only and is not to be taken by way of limitation, the spirit and scope of this invention being limited only by the terms of the appended claim.

We claim:
An element for use in nuclear reactions comprising an elongated body of graphite having a hexagonal cross section and an axial channel extending therethrough, a mass of uranium impregnated into the graphite surface confronting the axial channel, the uranium mass being concentrated adjacent to the surface of the graphite body confronting the chanel, a layer of tantalum nitride disposed upon the uranium impregnated surface confronting the channel, and a coating of tantalum carbide disposed on the surface of the tantalum nitride layer.

References Cited in the file of this patent

UNITED STATES PATENTS

| | | | |
|---|---|---|---|
| 656,652 | Markey | | Aug. 28, 1900 |
| 895,531 | Acheson | | Aug. 11, 1908 |
| 1,037,268 | Kuzel | | Sept. 3, 1912 |
| 1,098,794 | Fleming | | June 2, 1914 |
| 1,306,568 | Weintraub | | June 10, 1919 |
| 2,631,245 | Cohen | | Mar. 22, 1946 |
| 2,708,656 | Fermi et al. | | May 17, 1955 |

FOREIGN PATENTS

| | | |
|---|---|---|
| 10,815 | Great Britain | 1899 |
| 3,277 | Great Britain | 1915 |
| 861,390 | France | Feb. 7, 1941 |
| 233,011 | Switzerland | Oct. 2, 1944 |

OTHER REFERENCES

Smyth Report, "Atomic Energy for Military Purposes," August 1945. Copy may be purchased from Supt. of Documents, Washington, D.C.